UNITED STATES PATENT OFFICE.

ARNOLD ROST, OF DRESDEN, GERMANY.

PROCESS FOR RAPIDLY SEPARATING EMULSIONS FORMED BY AQUEOUS LIQUIDS WITH FATTY SUBSTANCES OF ANY KIND.

1,050,696.      Specification of Letters Patent.      Patented Jan. 14, 1913.

No Drawing.      Application filed March 11, 1912. Serial No. 683,099.

*To all whom it may concern:*

Be it known that I, ARNOLD ROST, a subject of the German Emperor, and resident of Dresden, Germany, have invented certain new and useful Processes for Rapidly Separating Emulsions Formed by Aqueous Liquids with Fatty Substances of Any Kind, of which the following is a specification.

The industries working with fats and oils are often very much annoyed and experience great difficulty in their work owing to the undesirable formation of emulsions between the fats or fatty acids, and the aqueous liquids employed for cleansing and for other purposes. In a similar manner certain fatty acids retain in a tenacious manner when the separation is carried out, glycerin water or diluted sulfuric acid forming emulsions. Now, as researches made in this line have demonstrated, these phenomena are frequently caused by the albumin or cell skins or membranes which are contained in more or less important quantities in every vegetable or animal fat or oil. The fat molecules and more especially those of the animal oils such as fish oils are surrounded by an extremely thin cell skin. These cell tissues produce the disagreeable formation of emulsions. This is proven by the fact that the emulsions are dissolved as soon as they are treated with concentrated sulfuric acid whereby the cell skins are carbonized. It is needless to say that this process can only be employed in the rarest cases because of the undesirable color produced. And where glycerin water inclosed in the fatty acid has to be separated therefrom, the method can not be employed at all. Now, on the basis of the aforesaid considerations I have found in formaldehyde and its polymeric modifications a means whereby the albumin or cell tissues may be coagulated without exerting a noxious influence on the fatty materials or the glycerin. The amount of formaldehyde employed will vary according to the quantity of albumin present. As a rule even in case of the most tenacious emulsion an addition of 0.3% of formaldehyde is sufficient for producing a rapid and easy separation.

I do not wish to confine myself to the use of formic aldehyde in its limited sense having the formula HCOH, since I am aware that its polymer $(HCOH)_3$ may be used in a similar manner with equally beneficial results; for example—for treating 4000 kilos of glycerin water and fish oil, an amount of paraformaldehyde corresponding to 2 kilos of gaseous formaldehyde is added and the whole is heated in a boiler at the boiling temperature of the emulsion for a few minutes.

Having now fully described my said invention, what I claim and desire to secure by Letters Patent, is:

1. The herein described process of separating emulsion comprising water and fat, consisting in adding formaldehyde to the emulsion to cause stratification of said water and fat.

2. The herein described process of separating emulsion comprising water and oil, consisting in adding formaldehyde to the emulsion to cause stratification of said water and oil.

In testimony whereof I have hereunto set my hand in presence of two witnesses.

ARNOLD ROST.

Witnesses:
    ULYSSES J. BYWATER,
    PAUL ARRAS.